(12) United States Patent
Morgulis et al.

(10) Patent No.: US 11,325,192 B2
(45) Date of Patent: May 10, 2022

(54) CUTTING TOOL FOR A CUTTING MACHINE

(71) Applicant: Vargus Ltd., Nahariya (IL)

(72) Inventors: Rafael Morgulis, Karmiel (IL); Alexander Orlov, Nahariya (IL)

(73) Assignee: Vargus Ltd., Nahariya (IL)

( * ) Notice: Subject to any disclaimer, the term of this patent is extended or adjusted under 35 U.S.C. 154(b) by 252 days.

(21) Appl. No.: 16/536,884

(22) Filed: Aug. 9, 2019

(65) Prior Publication Data
US 2020/0047259 A1   Feb. 13, 2020

(30) Foreign Application Priority Data
Aug. 10, 2018   (EP) ..................................... 18188389

(51) Int. Cl.
*B23B 27/16*   (2006.01)

(52) U.S. Cl.
CPC ................ *B23B 27/1662* (2013.01)

(58) Field of Classification Search
CPC .............. B23B 29/043; B23B 27/1622; B23B 2200/0423; B23B 2200/126;
(Continued)

(56) References Cited

U.S. PATENT DOCUMENTS 6,186,704 B1 * 2/2001 Hale ...................... B23B 27/04
407/101
6,343,898 B1   2/2002 Sjöö et al.
(Continued)

FOREIGN PATENT DOCUMENTS

DE   4302645 A1 *  8/1994 ............. B23D 61/06
EP   1543907 A1   6/2005
EP   3305449 A1   4/2018

OTHER PUBLICATIONS

English translation of DE 4302645 A1 (Year: 1994).*
European Search Report dated Apr. 3, 2019 in connection with corresponding European Patent Application No. 18188389.3.

*Primary Examiner* — Alan Snyder
(74) *Attorney, Agent, or Firm* — Akerman LLP (57) ABSTRACT

The invention relates to a cutting tool with a holder, a cutting insert and a screw, wherein the holder has at least one seat with a base, a first side wall and a second side wall, wherein in a plane parallel to the base the first side wall extends in a first direction and the second side wall includes an acute angle (C) with the first side wall, wherein the base has a threaded hole for receiving the screw, wherein the cutting insert has a cut-out for the screw, wherein the cutting insert has a base contact surface, a first positioning surface and a second positioning surface, and wherein in a locked position the base contact surface, the first positioning surface and the second positioning surface of the cutting insert contact the base, the first side wall and the second side wall of the at least one seat, respectively, wherein the second side wall is offset from the threaded hole in the first direction towards a front end of the seat, and in that a screw head of the screw and the cut-out of the cutting insert are provided with complementary conical surfaces, such that when tightening the screw the cutting insert is forced with the first positioning surface and the second positioning surface against the first side wall and the second side wall, respectively.

17 Claims, 5 Drawing Sheets

(58) Field of Classification Search
CPC ...... B23B 2200/3618; B23B 2200/369; B23B 2205/12; B23C 2200/367; B23C 2200/361
See application file for complete search history.

(56) References Cited

U.S. PATENT DOCUMENTS

| | | |
|---|---|---|
| 2003/0165362 A1 | 9/2003 | Hecht |
| 2008/0080937 A1 | 4/2008 | Hecht |
| 2013/0279995 A1 | 10/2013 | Hecht |
| 2014/0199128 A1* | 7/2014 | Hecht ................. B23B 27/1651 407/103 |
| 2018/0214961 A1 | 8/2018 | Elkayam |
| 2019/0022764 A1* | 1/2019 | Hecht ................... F16B 35/005 |
| 2019/0160550 A1* | 5/2019 | Hecht ..................... B23B 27/04 |

* cited by examiner

CUTTING TOOL FOR A CUTTING MACHINE

CROSS-REFERENCE TO RELATED APPLICATIONS

The present application claims priority to European Patent Application No. 18188389.3, filed Aug. 10, 2018, the entirety of which is incorporated herein by reference.

TECHNICAL FIELD AND PRIOR ART

The invention relates to a cutting tool for a cutting machine, in particular a milling machine or a lathe machine, for example a Swiss-type lathe machine.

In a Swiss-type or Swiss-style lathe machine a workpiece is held with both a collet and a guide bushing, wherein the collet is arranged behind the guide bushing. A cutting tool is arranged in front of the guide bushing. To cut lengthwise along the work piece, the cutting tool is moved towards and into the workpiece and the workpiece itself will move back and forth along its longitudinal axis, wherein the cutting tool remains in close vicinity to the guide bushing. Grooving and turning with a Swiss-type lathe machines is a process that requires high accuracy of both the cutting insert and its holder, and a possible replacement of inserts with return of a cutting edge to an initial position with the highest accuracy in order to produce a quality profiles.

It is generally known to provide cutting tools with so called parallelogram inserts with two cutting teeth, as shown for example in WO 03/074217 A1, wherein a cutting insert is positioned in a seat or pocket having two side walls, wherein the cutting insert contacts the side walls with a first positioning surface, which is provided at first surface opposite to a surface at which an active cutting edge is provided, and a second positioning surface, which is an inclined side surface of the insert adjoining a relief surface of a non-active cutting tooth. For a quick replacement or indexing, in accordance with WO 03/074217 A1, the cutting insert is provided with a through hole having a non-circular cross-section and a fastener is provided instead of a threaded clamping screw, which fastener remains in engagement with the holder during all stages of the attachment and clamping, or unclamping and removal of the cutting insert. The fastener is rotatable between a clamping position and a non-clamping position by means of one of two keys, one key being capable of engaging one of the fastener's ends, and the other key being capable of engaging the other of the fastener's ends.

SUMMARY OF THE INVENTION

It is the object of the invention to provide a cutting tool having a high rigidity, which in particular allows for a replacement of a cutting insert in short cycle time. It is a further object of the invention to provide a cutting insert for such a cutting tool.

This object is solved by the cutting tool and the cutting insert with the features of claims 1 and 9. Preferred embodiments are defined in the dependent claims.

According to a first aspect, a cutting tool with a holder, with a cutting insert and with a screw is provided, wherein the holder has at least one seat with a base, with a first side wall and with a second side wall, wherein in a plane parallel to the base the first side wall extends in a first direction and the second side wall includes an acute angle with the first side wall, wherein the base has a threaded hole for receiving the screw, wherein the cutting insert has a cut-out for the screw, wherein the cutting insert has a base contact surface, a first positioning surface and a second positioning surface, wherein in a locked position the base contact surface, the first positioning surface and the second positioning surface of the cutting insert contact the base, the first side wall and the second side wall of the at least one seat, respectively, wherein the second side wall is offset from the threaded hole in the first direction towards a front end of the seat, and wherein a screw head of the screw and the cut-out of the cutting insert are provided with complementary conical surfaces, such that when tightening the screw the cutting insert is forced with the first positioning surface and the second positioning surface against the first side wall and the second side wall, respectively.

According to a second aspect, a cutting insert for a cutting tool comprising a holder is provided, wherein the cutting insert has a base contact surface, a first positioning surface adjoining the base contact surface and a second positioning surface adjoining the base contact surface, wherein in a plane parallel to the base contact surface the first positioning surface extends in a first direction and the second positioning surface includes an acute angle with the first positioning surface, and wherein the cutting insert is provided with a cut-out for a screw, wherein the second positioning surface is offset from the cut-out in the first direction towards a front end of the cutting insert, and wherein the screw and the cut-out are provided with complementary conical surfaces, such that when tightening the screw the cutting insert is forced with the first positioning surface and the second positioning surface against side walls of a seat of the holder.

In the context of the application, a front end of a cutting insert is the end at which an active cutting tooth is provided. A front end of a seat is respectively the end from which an active cutting tooth protrudes. In the context of the application, an acute angle is an angle, which is less than 90°.

The cutting insert is positioned by a pairing of the positioning surfaces of the cutting insert with the respective side walls of the holder and by a pairing of the conical surface of the cutting insert with the conical surface of the screw head.

In contrast to prior art cutting tools with a parallelogram cutting insert, in which an inclined surface adjoining a relief surface of a non-active cutting tooth is used as the second positioning surface, which inclined surface is offset from a fastening element away from the front end of the seat, the second side wall and the second positioning surface are offset from the screw towards the front end. By offsetting the second side wall and the second positioning surface from the screw towards the front end, and, thus, closer to a cutting edge, a stability of the system is increased. In one embodiment, the second side wall is provided at a front end of the holder.

In one embodiment, the cutting insert is a parallelogram insert with two cutting teeth and the cut-out is a through-hole. In preferred embodiments, the cutting insert has a single cutting tooth, wherein the cut-out is provided at an end surface of the cutting insert opposite to the cutting tooth. In case the cutting insert has a single cutting tooth, the front end of the cutting insert is the end at which the single cutting tooth is provided. The front end of a seat is respectively the end from which the single cutting tooth of an inserted cutting insert protrudes.

Providing the cut-out at an end surface allows for a very quick replacement of the cutting insert as the screw does not have to be completely unscrewed from the holder. In addition, decreasing the number of cutting teeth allows for a more rigid holder. The cut-out is preferably less than a semi-circle.

The threaded hole, in case the cutting insert has a single cutting tooth, in embodiments of the invention is provided at a rear end of the seat, wherein preferably the conical surface is provided at the circumference of the threaded hole not coinciding with the seat for receiving the screw head of the screw. In a preferred embodiment, an axis of the threaded hole is offset to an axis of the conical surface, such that upon tightening the screw, the screw head first contacts the conical surface in an initial contact position opposite the second side wall, wherein the initial contact position includes an acute angle in a circumferential direction of the conical surface with a longitudinal direction of the holder between about 30° and about 70°. The initial contact position defines a locking direction for clamping the cutting insert between the screw and the holder, wherein due to the offset conical surface a clamping force is provided by the conical surface and additional loads for clamping the cutting insert are avoided on the thread of the screw. In this case, applying a tightening torque on the screw causes the screw head to slide with respect to the conical surface of the holder in a direction defined by the initial contact position until the screw head contacts the cutting insert and forces the cutting insert towards the second side wall.

In a preferred embodiment, the first positioning surface is provided at a first side surface of the cutting insert and a cutting edge is provided at a side surface of the cutting insert, which is opposite to the first side surface. With such an arrangement, due to the cutting forces the cutting insert is forced towards the first side wall contacted by the first positioning surface, hence, a very rigid system is provided.

In one embodiment, the cutting insert has a step at its base surface, wherein the base contact surface is provide on a flat face of the step and the second positioning surface is provided on a front face of the step. In case only one single cutting tooth is provided, the cutting tooth protrudes from the front face of the step. In contrast, the first positioning surface preferably is provided on a surface without steps for providing a large contact surface.

In a preferred embodiment, a maximum extent of the cutting insert perpendicular to the base contact surface is larger than a height of the second side wall perpendicular to the base. Hence, the cutting insert extends beyond the second side wall, wherein for example a front end of the cutting insert with the cutting tooth extends beyond the step and, thus, beyond the second side wall. The first side wall is preferably higher than the second side wall so that the cutting insert is contacted at least essentially over its entire extent.

In a preferred embodiment, the second side wall and the base and the second positioning surface and the base contact surface each include an acute angle, in particular an acute angle between about 50° and about 85°. In alternative or in addition, the first side wall and the base and the first positioning surface and the base contact surface each include an acute angle, in particular an acute angle between about 70° and about 85°. Due to the acute angle(s) included, an additional clamping effect is achieved. In preferred embodiment, an undercut is provided between the adjoining walls of the seat and/or a chamfer is provided between the adjoining surfaces of the cutting insert for avoiding an overdetermination or redundancy.

In another preferred embodiment, the first side wall and second side wall and the first positioning surface and the second positioning surface each include an acute angle between about 45° and about 70°. The first side wall in preferred embodiments extends along a longitudinal direction of a holder, in particular a holder for a lathe cutting tool. In other embodiments, the first side wall extends in radial directions of a holder, in particular a holder of a milling tool. In one embodiment, the second side wall is provided at a front end of the seat, wherein the second side wall is inclined with respect to a front end.

Further characteristics and advantages of the invention will emerge from the claims and from the following description of embodiments schematically illustrated in the drawings.

BRIEF DESCRIPTION OF THE DRAWINGS

In the following, an embodiment of the invention will be described in detail with reference to the drawings. Throughout the drawings, the same elements will be denoted by the same reference numerals.

DETAILED DESCRIPTION OF EMBODIMENTS OF THE INVENTION

FIGS. 1 to 6 show a first embodiment of a cutting tool 1 in a perspective view, a top view, a partly sectioned top view, a front view, a side view, and an exploded view, respectively. The cutting tool 1 comprises a holder 2, a cutting insert 3, and a screw 4 with a conical screw head 40. FIG. 7 shows the holder 2 in a perspective view. FIGS. 8 to 11 show the cutting insert 3 in a perspective view from a rear end, perspective view from a front end, a top view, and a side view, respectively. The cutting tool 1 of the first embodiment is a cutting tool for a lathe machine, for example a Swiss-type lathe.

In the context of the application, expressions such as "top", "bottom", "left", "right" and others are only used for describing the figures and not to be understood as limiting the scope of the invention.

Figure 6:
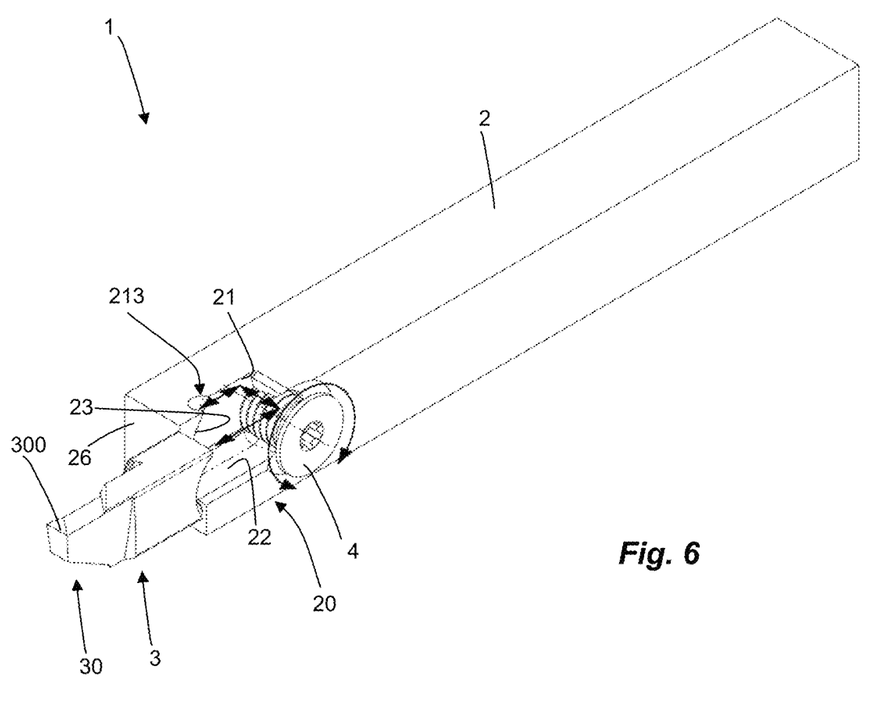
FIG. 6: shows in an exploded view the cutting tool of FIG. 1.
Figure 7:
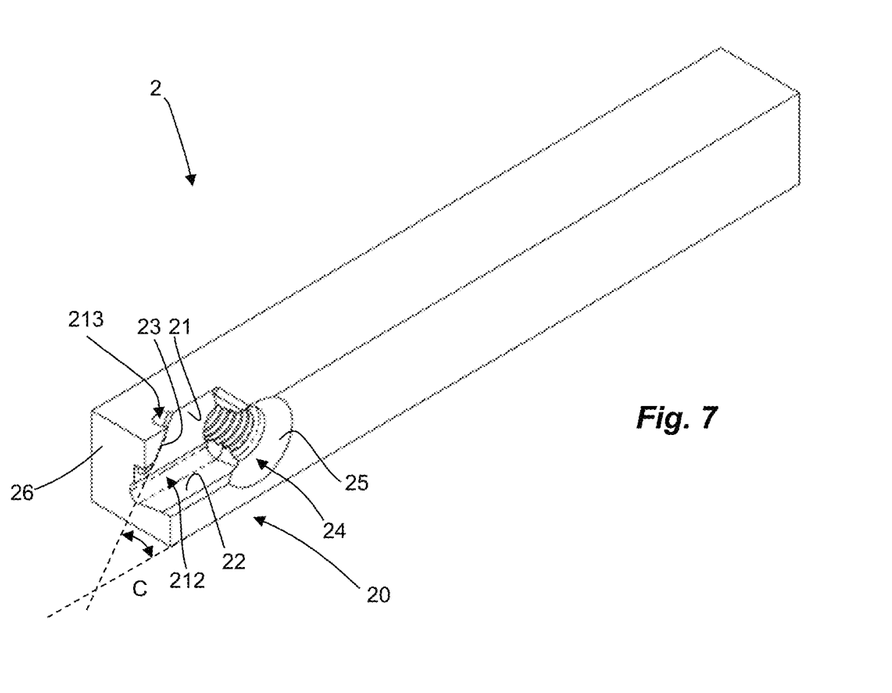
FIG. 7: shows in a perspective view the holder of the cutting tool of FIG. 1.
Figure 8:
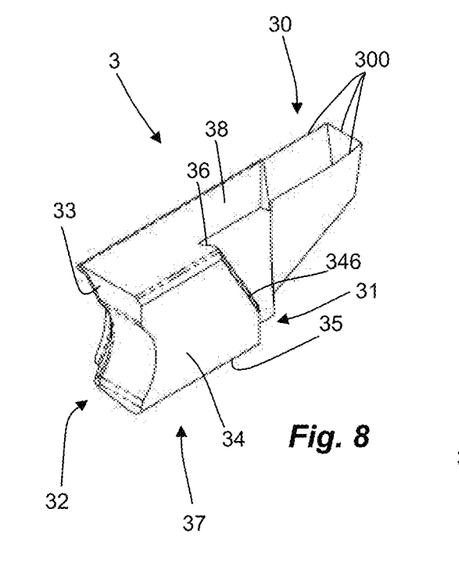
FIG. 8: shows in a perspective view from a rear end the cutting insert of the cutting tool of FIG. 1.
Figure 9:
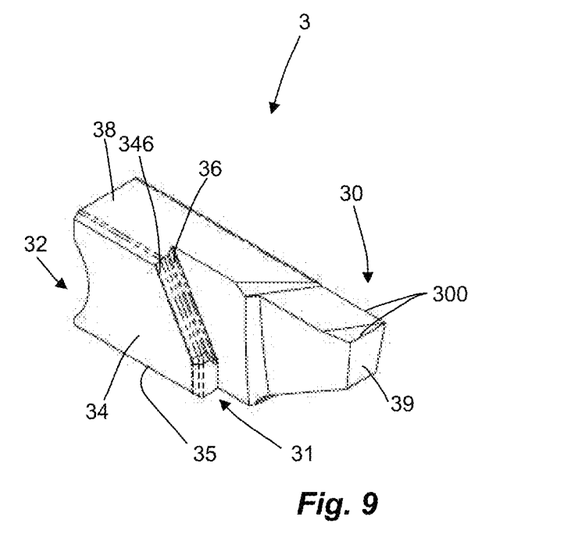
FIG. 9: shows in a perspective view from a front end the cutting insert of FIG. 8.
Figure 10:
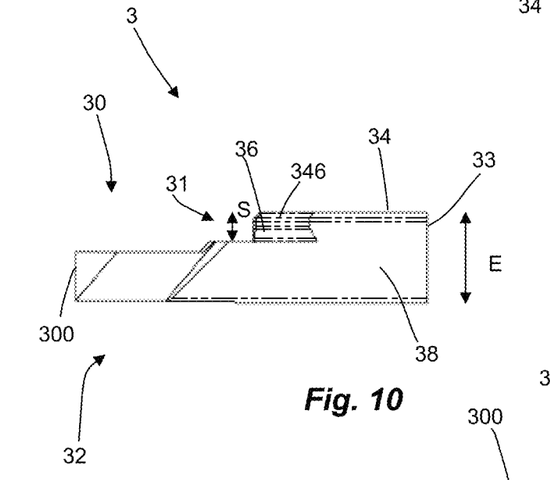
FIG. 10: shows in a top view the cutting insert of FIG. 8.
Figure 11:
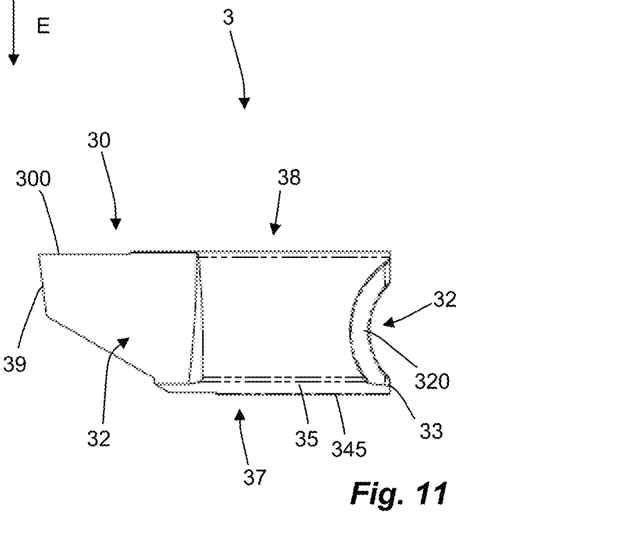
FIG. 11: shows in a side view the cutting insert of FIG. 8.

As best seen in FIGS. 6 and 7, the holder 2 according to the first embodiment has one seat 20 with a base 21, a first side wall 22 extending in a first direction, which is the longitudinal direction of the holder 2, and a second side wall 23 including an acute angle C with the first side wall 22. The base 21 has a threaded hole 24 for receiving the screw 4. The threaded hole 24 is provided at a rear end of the seat 20. At a circumference of the threaded hole 24, which does not coincide with the seat 20, a conical surface 25 is provided for receiving the conical screw head 40 of the screw 4. The second side wall 23 is offset from the threaded hole 24 in the first direction towards a front end of the seat, which is provided at a front end 26 of the holder 2.

Figure 1:
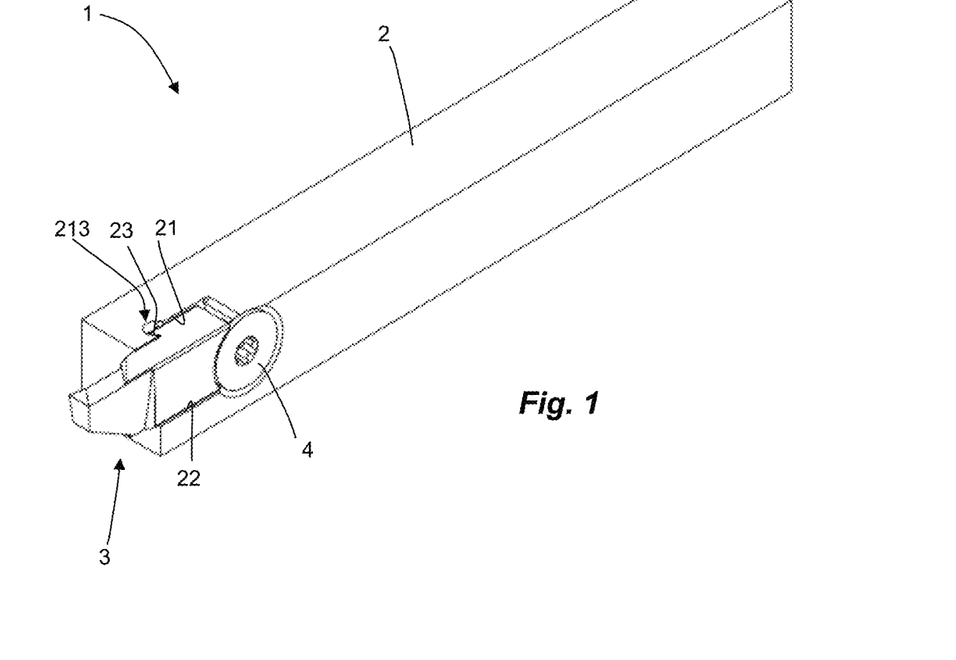
FIG. 1: shows in a perspective view a first embodiment of a cutting tool with a holder, a cutting insert and a screw.
Figure 2:
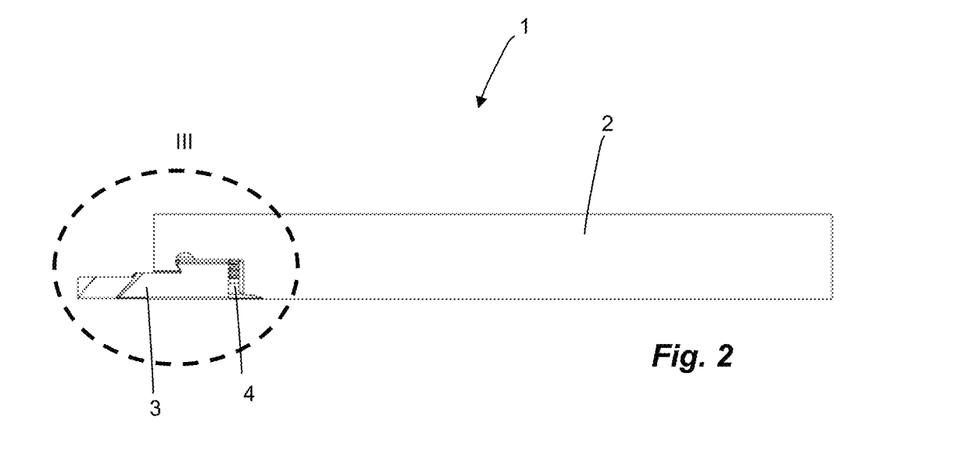
FIG. 2: shows in a top view the cutting tool of FIG. 1.
Figure 3:
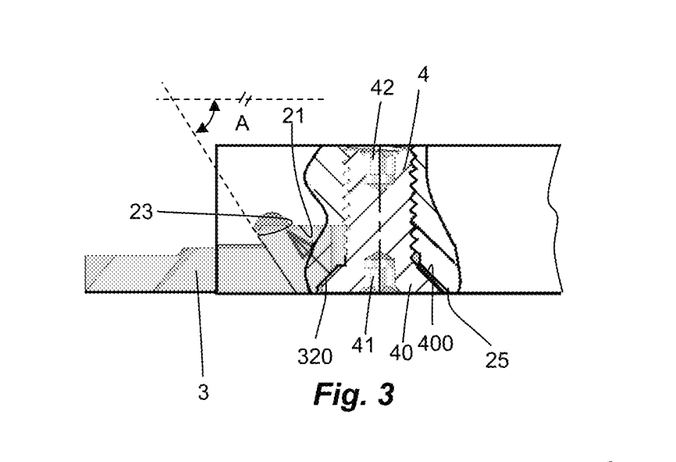
FIG. 3: shows in partly sectional view of a detail III of FIG. 2.
Figure 4:
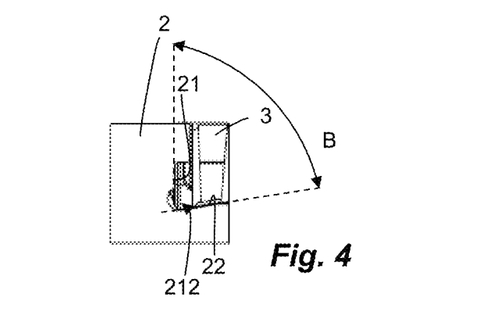
FIG. 4: shows in a front view the cutting tool of FIG. 1.
Figure 5:
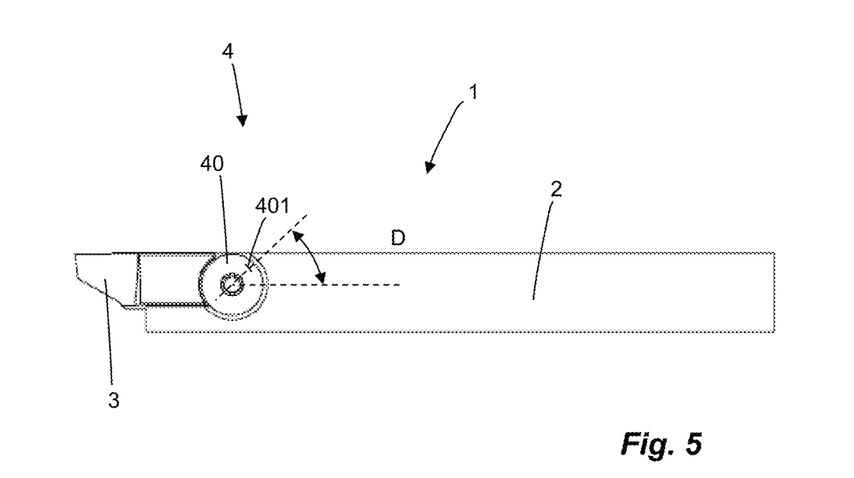
FIG. 5: shows in a side view the cutting tool of FIG. 1.

As best seen in FIG. 3, the second side wall 23 and the base 21 include an acute angle A. The acute angle A is for example between about 50° and about 85°. In the embodiment shown the acute angle A is about 60°, however, the invention is not limited to this embodiment. As shown in FIGS. 4 and 5, at a transition between the base 21 and the second side wall 23, an undercut 213 is provided for avoiding an overdetermination.

As best seen in FIG. 4, the first side wall 22 and the base 21 include an acute angle B. The acute angle B is for example between about 70° and about 85°. In the embodiment shown the acute angle B is about 80°, however, the invention is not limited to this embodiment. At a transition between the base 21 and the first side wall 22, an undercut 212 is provided for avoiding an overdetermination.

The cutting insert 3 is shown in more detail in FIGS. 8 to 11. The cutting insert 3 of the embodiment shown has a single cutting tooth 30 with a cutting edge 300.

The cutting insert 3 further has a cut-out 32 for the screw 4. The cut-out 32 is provided at an end surface 33 of the cutting insert 3 opposite to the cutting tooth 30.

For positioning the cutting insert 3 in the seat 20 of the holder 2, the cutting insert has a base contact surface 34, a first positioning surface 35 and a second positioning surface 36, wherein in a locked position shown in FIGS. 1 to 5 the base contact surface 34, the first positioning surface 35 and the second positioning surface 36 of the cutting insert 3 contact the base 21, the first side wall 22 and the second side wall 23 of the seat 20, respectively. The first positioning surface 35 is provided at a first side surface 37 of the cutting insert 3 and the cutting edge 300 is provided at a transition edge between a side surface 38 of the cutting insert 3, which is opposite to the first side surface 37, and a front surface 39.

The first positioning surface 35 and the base contact surface 34 include an acute angle, which is at least essentially the same as the angle B between the first side wall 22 and the base 21 of the seat 20. At a transition between the base contact surface 34 and the first positioning surface 35, a chamfer 345 is provided.

The second positioning surface 36 and the base contact surface 34 include an acute angle, which is at least essentially the same as the angle A between the second side wall 23 and the base 21 of the seat 20. At a transition between the base contact surface 34 and the second positioning surface 36, a chamfer 346 is provided.

The cutting insert 3 has a step 31 at its base surface, wherein the base contact surface 34 is provided on a flat face of the step 31 and the second positioning 36 surface is provided on an inclined front face of the step 31. The cutting tooth 30 protrudes from the step 31 towards a front end of the cutting insert 3.

A height of the second side wall 23 of the seat 20 perpendicular to the base 21 at least essentially corresponds to the extent S (see FIG. 10) of the step 31 perpendicular to the base contact surface 34. A maximum extent E of the cutting insert 3 perpendicular to the base contact surface 34 is larger than the height of the second side wall 23.

As best seen in FIG. 3, the screw head 40 of the screw 4 and the cut-out 32 of the cutting insert 3 are provided with complementary conical surfaces 400, 320, such that when tightening the screw 4 the cutting insert 3 is forced with the first positioning surface 35 and the second positioning surface 36 against the first side wall 22 and the second side wall 23, respectively.

The screw 4 is provided at both ends with keying elements 41, 42 for engaging with a key (not shown) for tightening or untightening the screw 4.

As schematically shown in FIG. 6, initially the cutting insert 3 is placed in the seat of the holder 2 and the cutting insert 3 is placed between the seat 20 of the holder 2 and the conical surface 400 of the screw 4. An axis of the threaded hole 24 (see FIG. 7) is slightly offset to an axis of the conical surface 25 such that the screw head 4 initially comes into contact with the holder 2 in an initial contact position 401 schematically indicated in FIG. 5. The offset is chosen, such that the initial contact position 401 includes an angle D with the longitudinal direction of the holder 2 in a circumferential direction, which defines a locking direction for the cutting insert 3. The angle D in preferred embodiments differs from the angle C between the second side wall 23 and the first side wall 22 so that the locking direction has a component perpendicular to the first side wall 22 and the second side wall 23. The cutting insert 3 is forced into its final locking position by applying tightening torque on the screw 4, which causes the screw head 40 to slide with respect to the conical surface 25 of the holder 2 until the screw head 40 contacts the cutting insert 3.

The base 21, the first side wall 22 and the second side wall 23 of the holder 2 together with the base contact surface 34, first positioning surface 35 and the second positioning surface 36 and the screw 4 form a clamping system. As mentioned above, in the embodiment shown in FIGS. 1 to 11, the clamping system is used in cutting tool 1 for a lathe machine. However, the clamping system can also be used in other applications.

Figure 12:
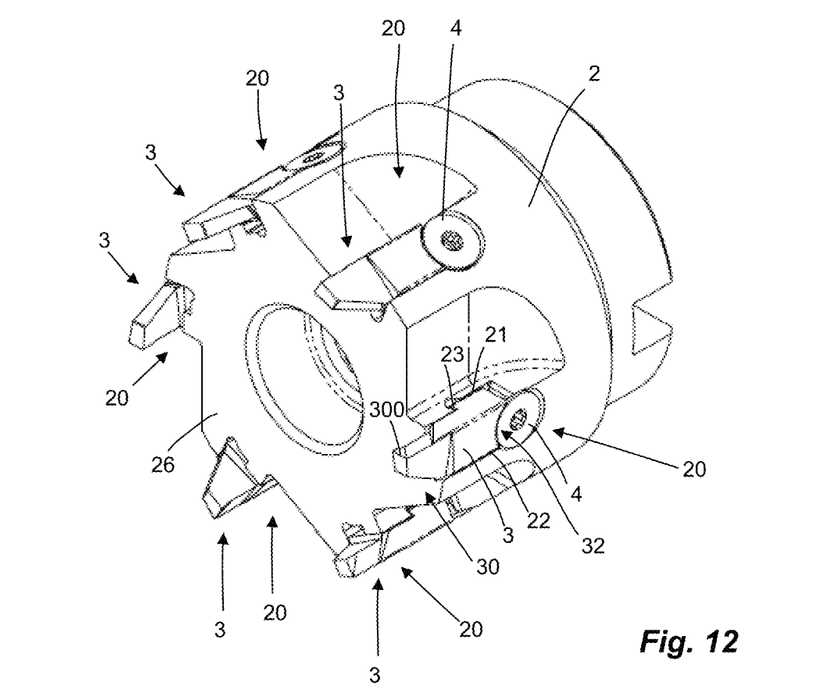
FIG. 12: shows in a perspective view a second embodiment of a cutting tool with a holder and several cutting inserts.
Figure 13:
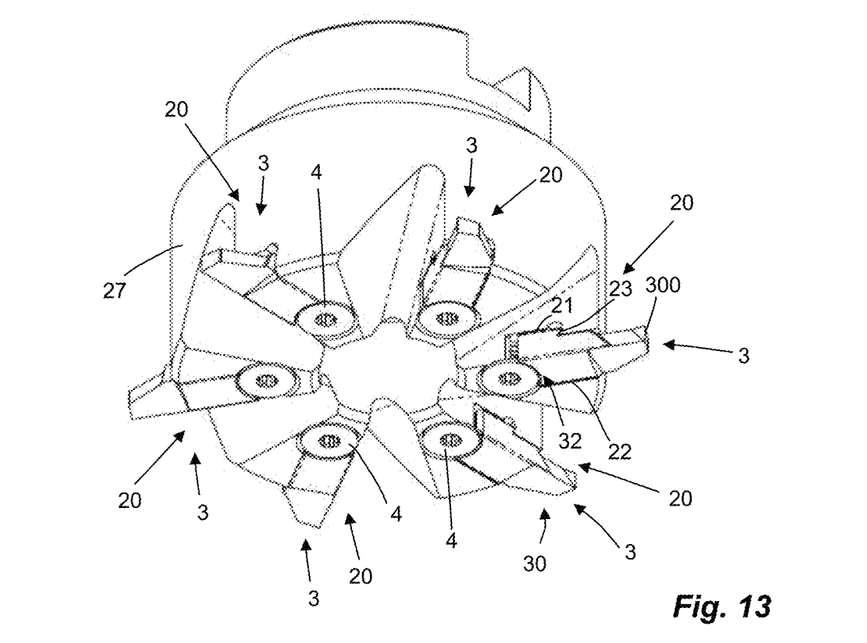
FIG. 13: shows in a perspective view a third embodiment of a cutting tool with a holder and several cutting inserts.

FIGS. 12 and 13 each show a cutting tool 1 in the form of a milling head having an identical or similar clamping system as the cutting tool 1 shown in FIGS. 1 to 10. For the same or similar elements consistent reference numbers are used. The cutting tools 1 shown in FIGS. 12 and 13 each have a holder 2 with several, in the embodiment shown six seats 20, which are distributedly arranged about a circumference of the holder 2. In each seat 20, a cutting insert 3 is positioned, which is fixed to the seat 20 by means of a screw 4. All seats 20 of one holder 2 are identical in design.

Each seat 20 has a base 21, a first side wall 22 extending in a first direction and a second side wall 23 including an acute angle with the first side wall 22. In the embodiment shown in FIG. 12, the first direction is parallel to a longitudinal direction of the holder 2. In the embodiment shown in FIG. 13, the first direction is a radial direction of the holder 2. The base 21 of each seat 20 has a threaded hole for receiving the screw 4, which threaded hole is not visible in FIGS. 12 and 13.

The cutting inserts 3 are identical or similar in design to the cutting inserts 3 shown in FIGS. 8 to 11. Each cutting insert 3 has a single cutting tooth 30 with a cutting edge 300 and a cut-out 32 for the screw 4, which is arranged at an end surface opposite the cutting tooth 30.

As described above with reference to FIGS. 8 to 11, each cutting insert 3 has a base contact surface 34, a first positioning surface 35 and a second positioning surface 36, wherein each cutting insert 3 in the depicted locked position the base contact surface 34, the first positioning surface 35 and the second positioning surface 36 of the cutting inserts 3 contact the base 21, the first side wall 22 and the second side wall 23 of the associated seat 20, respectively.

The second side wall 23 of the seat is offset from the threaded hole 24 in the first direction towards a front end 26 of the seat 20. In the embodiment shown in FIG. 12, the front end 26 of the seat is at the front end of the holder 2. In the embodiment shown in FIG. 13, the front end of the seat 20 is arranged at a circumferential surface 27 of the holder 2.

The second side wall 23 and the base 21 as well as the second positioning surface 36 and the base contact surface 34 each include an acute angle A. Similar, the first side wall 22 and the base 21 and the first positioning surface 35 and the base contact surface 34 each include an acute angle B.

As described above, screw heads 40 of the screws 4 and the cut-outs 32 of the cutting inserts 3 are provided with complementary conical surfaces, such that when tightening one of the screws 4 the respective cutting insert 3 is forced with the first positioning surface 35 and the second positioning surface 36 against the first side wall 22 and the second side wall 22, respectively.

The invention claimed is:

1. A cutting tool with a holder, a cutting insert and a screw, wherein the holder has at least one seat with a base, a first side wall and a second side wall, wherein in a plane parallel to the base the first side wall extends in a first direction and the second side wall includes an acute angle (C) with the first side wall, wherein an apex of the acute angle (C) is in front of the at least one seat, wherein the base has a threaded hole for receiving the screw, wherein the cutting insert has a cut-out for the screw, wherein the cutting insert has a base contact surface, a first positioning surface and a second positioning surface, and wherein in a locked position the base contact surface, the first positioning surface and the second positioning surface of the cutting insert contact the base, the first side wall and the second side wall of the at least one seat, respectively, wherein the second side wall is offset from the threaded hole in the first direction towards a front end of the seat, wherein a screw head of the screw and the cut-out of the cutting insert are provided with complementary conical surfaces, such that when tightening the screw the cutting insert is forced with the first positioning surface and the second positioning surface against the first side wall and the second side wall, respectively.

2. The cutting tool according to claim 1, wherein the cutting insert has a single cutting tooth, wherein the cut-out is provided at an end surface of the cutting insert opposite to the cutting tooth, and wherein the threaded hole is provided at a rear end of the seat.

3. The cutting tool according to claim 2, wherein a conical surface is provided at the circumference of the threaded hole not coinciding with the seat for receiving the screw head of the screw, wherein an axis of the threaded hole is offset to an axis of the conical surface, such that upon tightening the screw, the screw head first contacts the conical surface in an initial contact position opposite the second side wall, wherein the initial contact position includes an acute angle (D) in a circumferential direction of the conical surface with a longitudinal direction of the holder between about 30° and about 70°.

4. The cutting tool according to claim 1, wherein the first positioning surface is provided at a first side surface of the cutting insert and a cutting edge is provided at a transition edge between a side surface of the cutting insert, which is opposite to the first side surface, and a front surface.

5. The cutting tool according to claim 1, wherein the cutting insert has a step at its base surface, wherein the base contact surface is provided on a flat face of the step and the second positioning surface is provided on a front face of the step, wherein a maximum extent (E) of the cutting insert perpendicular to the base contact surface is larger than a height of the second side wall perpendicular to the base.

6. The cutting tool according to claim 1, wherein the second side wall and the base and/or the second positioning surface and the base contact surface each include an acute angle (A) between about 50° and about 85°.

7. The cutting tool according to claim 1, wherein the first side wall and the base and/or the first positioning surface and the base contact surface each include an acute angle (B) between about 70° and about 85°.

8. The cutting tool according to claim 1, wherein the first side wall and second side wall and the first positioning surface and the second positioning surface each include an acute angle (C) between about 45° and about 70°.

9. A cutting insert for a cutting tool comprising a holder and a screw, wherein the cutting insert has a base contact surface, a first positioning surface adjoining the base contact surface and a second positioning surface adjoining the base contact surface, wherein in a plane parallel to the base contact surface the first positioning surface extends in a first direction and the second positioning surface includes an acute angle (C) with the first positioning surface, wherein an apex of the acute angle (C) points towards a front end of the cutting insert, and wherein the cutting insert is provided with a cut-out for a screw, wherein the second positioning surface is offset from the cut-out in the first direction towards the front end of the cutting insert, and wherein the screw and the cut-out are provided with complementary conical surfaces, such that when tightening the screw the cutting insert is forced with the first positioning surface and the second positioning surface against side walls of a seat of the holder.

10. The cutting insert according to claim 9, wherein the cutting insert has a single cutting tooth, wherein the cut-out is provided at an end surface of the cutting insert opposite to the cutting tooth.

11. The cutting insert according to claim 9, wherein the first positioning surface is provided at a first side surface of the cutting insert and a cutting edge is provided at a transition edge between a side surface of the cutting insert, which is opposite to the first side surface, and a front surface.

12. The cutting insert according to claim 9, wherein the cutting insert has a step at its base surface, wherein the base contact surface is provided on a flat face of the step and the second positioning surface is provided on a front face of the step.

13. The cutting insert according to claim 9, wherein the second positioning surface and the base contact surface include an acute angle (A) between about 50° and about 85°.

14. The cutting insert according to claim 9, wherein the first positioning surface and the base contact surface include an acute angle (B) between about 70° and about 85°.

15. The cutting insert according to claim 9, wherein the first positioning surface and the second positioning surface include an acute angle (C) between about 45° and about 70°.

16. A cutting tool with a holder, a cutting insert and a screw,
wherein the holder has at least one seat with a base, a first side wall and a second side wall,
wherein in a plane parallel to the base the first side wall extends in a first direction and the second side wall includes an acute angle (C) with the first side wall,
wherein the base has a threaded hole for receiving the screw,
wherein the threaded hole is provided at a rear end of the seat,
wherein the cutting insert has a single cutting tooth,
wherein the cutting insert has a cut-out for the screw, wherein the cut-out is provided at an end surface of the cutting insert opposite to the cutting tooth, and wherein the cutting insert has a base contact surface, a first positioning surface and a second positioning surface, and wherein in a locked position the base contact surface, the first positioning surface and the second positioning surface of the cutting insert contact the base, the first side wall and the second side wall of the at least one seat, respectively, wherein the second side wall is offset from the threaded hole in the first direction towards a front end of the seat, wherein a screw head of the screw and the cut-out of the cutting insert are provided with complementary conical surfaces, such that when tightening the screw the cutting insert is forced with the first positioning surface and the second positioning surface against the first side wall and the second side wall, respectively, and wherein a conical surface is provided at the circumference of the threaded hole not coinciding with the seat for receiving the screw head of the screw.

17. The cutting tool according to claim 16, wherein an axis of the threaded hole is offset to an axis of the conical surface, such that upon tightening the screw, the screw head first contacts the conical surface in an initial contact position opposite the second side wall, wherein the initial contact position includes an acute angle (D) in a circumferential direction of the conical surface with a longitudinal direction of the holder between about 30° and about 70°.

\* \* \* \* \*